United States Patent [19]

Pitha

[11] 4,198,443
[45] Apr. 15, 1980

[54] SINTERLESS ZINC OXIDE VARISTOR DEVICES

[75] Inventor: John J. Pitha, Lenox, Mass.
[73] Assignee: General Electric Company, N.Y.
[21] Appl. No.: 910,073
[22] Filed: May 26, 1978
[51] Int. Cl.² .......................... B05D 1/00; B05D 1/08
[52] U.S. Cl. ......................................... 427/34; 338/20;
427/88; 427/101; 427/103; 427/105; 427/271;
427/277; 427/423; 427/425
[58] Field of Search .................... 427/34, 88, 103, 101,
427/105, 425, 271, 277, 423; 219/76.16, 121 P;
428/539, 446; 338/20, 21, 22

[56] References Cited

U.S. PATENT DOCUMENTS

| | | | |
|---|---|---|---|
| 2,671,735 | 3/1954 | Grisdale et al. | 427/101 X |
| 3,437,974 | 4/1969 | Spiegler | 427/101 X |
| 3,640,757 | 2/1972 | Grubba | 427/34 |
| 3,698,936 | 10/1972 | Moltzan | 427/423 |
| 3,759,739 | 9/1973 | Varlas | 427/423 X |
| 3,903,494 | 9/1975 | May | 427/101 X |
| 3,984,591 | 10/1976 | Plumat et al. | 427/427 X |

Primary Examiner—Shrive P. Beck
Attorney, Agent, or Firm—Francis X. Doyle; Richard A. Menelly

[57] ABSTRACT

Sinterless zinc oxide varistor devices are prepared in one embodiment by flame spraying premixed zinc oxide and additive metal oxide powders onto a refractory substrate. The coated substrate is then treated by an abrasive removal process to form a trimmable resistor. A further embodiment comprises the use of a plasma spray process wherein carbonates and nitrates of the varistor constituents are oxidized in situ by entrainment within an oxygen gas stream and directing the plasma upon a rotating substrate. Ultra pure zinc oxide varistor devices having excellent electrical properties can be prepared in this manner.

9 Claims, 6 Drawing Figures

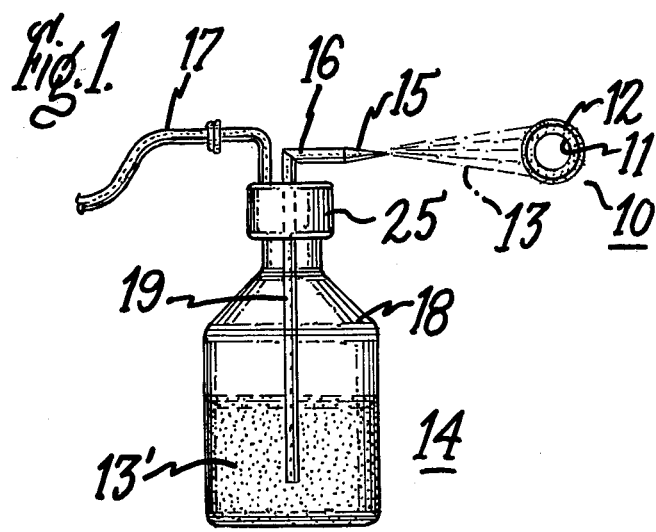
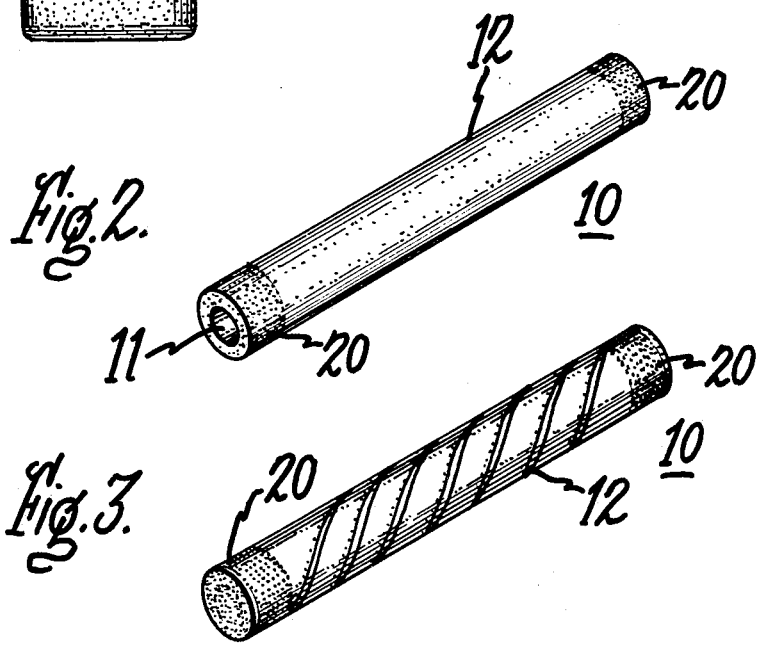
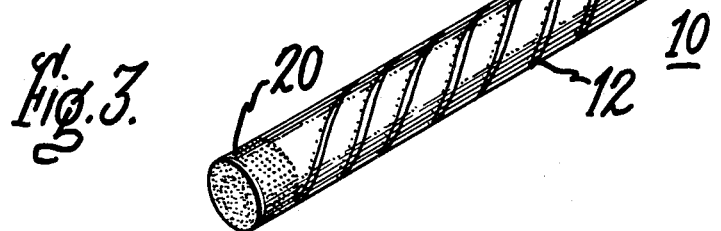
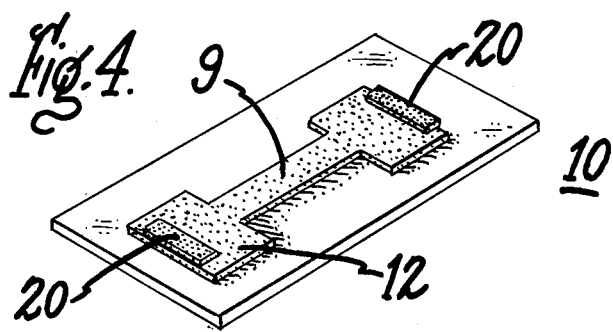

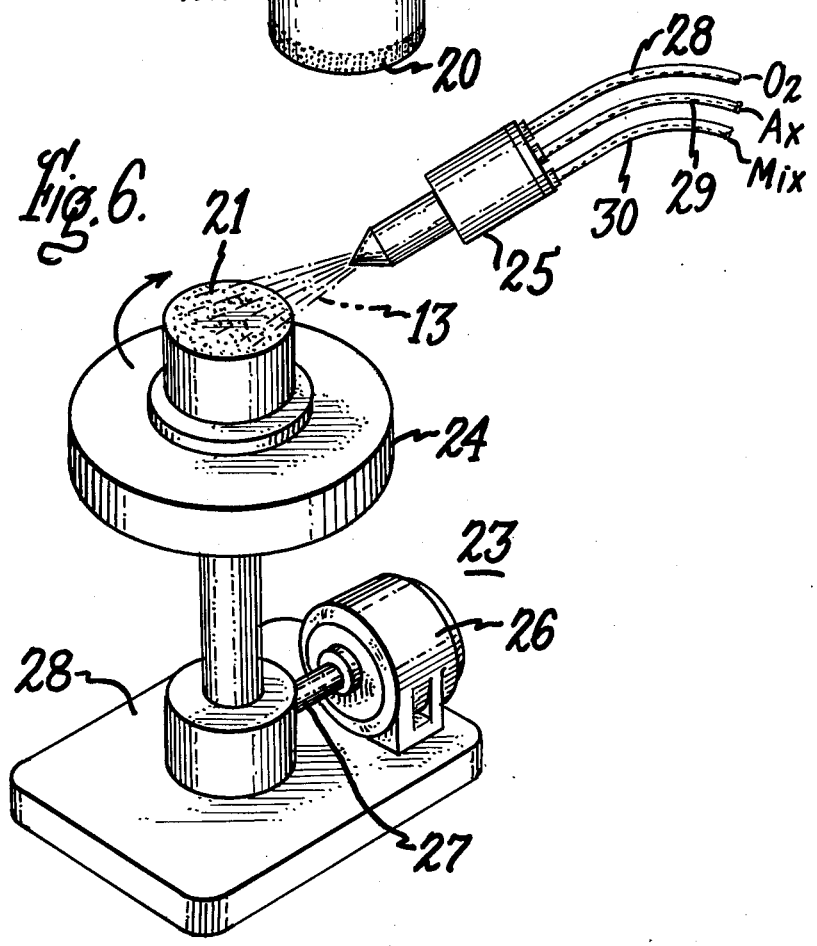

SINTERLESS ZINC OXIDE VARISTOR DEVICES

BACKGROUND OF THE INVENTION

Zinc oxide varistors of the type used with surge arrester devices are currently prepared by batch mixing and ball milling techniques wherein the zinc oxide powder is combined with certain additive metal compounds for pressing and sintering into solid discs. After sintering, the discs are then coated with a layer of conductive metal to provide electrodes to the discs. Pressing and sintering the discs into prescribed cylindrical configurations requires a good deal of preparation time and contributes to the overall varistor costs.

The electrical properties of the varistors, for example, the exponent n and resistance R must be uniform from batch to batch to ensure uniformity of electrical characteristics among the various varistors. Removing the varistors having unacceptably low exponent values causes a decrease in the material's operating efficiency since defective varistor discs quite often must be discarded. Methods for currently reclaiming rejected zinc oxide varistor discs require that the discs be completely reprocessed including costly repressing and resintering operations.

The purpose of this invention is to provide means for forming inexpensive zinc oxide varistor electrical elements from rejected varistor discs in one embodiment and for forming high purity zinc oxide varistor discs from high purity starting materials in another embodiment.

BRIEF DESCRIPTION OF THE DRAWINGS

FIG. 1 is a side view of a flame spray coating apparatus for use within the invention;

FIG. 2 is a top perspective view of one embodiment of a sinterless zinc oxide varistor manufactured by the methods of the invention;

FIG. 3 is a top perspective view of the varistor of FIG. 2 in the form of a trimmable resistor;

FIG. 4 is a top perspective view of a zinc oxide varistor fuse device;

FIG. 5 is a front perspective view of a high purity zinc oxide varistor manufactured by a plasma spray technique; and FIG. 6 is a side view of a plasma spray apparatus for manufacturing the varistor of FIG. 5.

DESCRIPTION OF THE PREFERRED EMBODIMENT

FIG. 1 shows a flame spraying apparatus 14 of the type utilizing a high temperature flame 15 and a special nozzle 16 wherein an oxyhydrogen gas flame is used for the purpose of directing the powder stream 13 onto the surface of substrate 11. The metal oxide varistor components 13' are propelled by combustible gases through pipe 19 and tubing 17 up into manifold 25 where they become heated upon further passage through nozzle 16 and flame 15. The heated powder stream 13 is caused to impinge upon a rotating tubular substrate 11 such that the powder 13' within container 18 forms an oxide coating 12. The oxide coating tightly adheres to the substrate by becoming fused thereon in the deposition process. A coated substrate 10 containing an oxide coating 12 is shown in FIG. 2 wherein the substrate 11 also contains a metal coating 20 at each end of the substrate to provide electrical access with the oxide coating. The substrate 11 comprises a refractory tubing. The refractory material can comprise a silica or alumina compound or a ceramic or porcelain material. The metal coating generally comprises aluminum metal deposited by the same flame spray techniques as for the oxide coating 12. The metal coating can be applied directly on top of the oxide coating or upon the substrate contingent with the oxide material.

FIG. 3 contains a coated substrate 10 similar to the coated substrate of FIG. 2 with part of the oxide layer removed by an abrasive grit blasting technique so that the remaining oxide 12 exhibits a continuous long filament of very thin cross section. The embodiment of FIG. 3 comprises a trimmable non-linear resistor device having a very high resistance value and containing electrodes at each end formed by the metal coating 20.

A varistor fuse device is provided by the coated substrate 10 of FIG. 4 wherein the oxide material 12 is deposited upon a flat substrate 8 and contains a region 9 of reduced thickness. The metal coating 20 at each end of the coated substrate provides electrodes to the device and the reduced thickness 9 is designed to melt and break contact between the electrodes when the power capacity of the device is exceeded. The embodiment of FIG. 4 therefore combines non-linear resistive properties due to the operating characteristics of the oxide coating 12 with a fusible feature to protect sensitive circuit elements from conditions of excess current as well as excess voltage.

The flame spray apparatus of FIG. 1 is particularly useful for reclaiming the zinc oxide powder from rejected varistors. The varistors are crushed, pulverized, and classified through a 200 mesh sieve to provide pinhole free, tightly adherent coatings upon flame deposition.

A sinterless zinc oxide varistor 21 having exceptional electrical properties is shown in FIG. 5 and consists of a highly pure zinc oxide disc containing a deposited metal coating 20 at both ends for providing electrical contact with the zinc oxide material. A ceramic collar 22 is provided around the periphery of the varistor in order to prevent varistor current from transferring in the vicinity of the periphery rather than through the bulk cross section of the varistor. The highly purified zinc oxide composition is achieved by the vapor deposition process depicted in FIG. 6. The highly purified materials are obtained by in situ oxidation of the nitrates or carbonates of the constituents. Other materials such as oxalates, acetates and other anions of organic acids, which thermally decompose to their oxides, can also be employed. The zinc oxide percursor comprises zinc nitrate and other materials such as bismuth, titanium, magnesium and cobalt are provided by either their respective carbonates or nitrates. In order to ensure sufficient oxygen to completely oxidize the carbonates and nitrates of the constituents, the materials, in powder form, are entrained within a stream of pure oxygen. In order to energize the plasma discharge an ionizable and inert gas, such as argon, is also transported through the plasma nozzle 16 along with the powder constituents. A first tube 28 is connected with a source of highly purified oxygen gas, a second tube 29 is connected with a highly purified tank of argon and a third tube 30 is connected to a container having the mixed oxide precursors. The mixing between the oxygen and the precursor materials occurs within the manifold 25 and the mixed oxygen, argon and precursor materials transmit through nozzle 16 wherein a plasma carries the powder 13 to a rotating support 24. The powder precursor materials can be directly entrained within the oxygen gas by passing the oxygen gas through the container and forcing the precursor powders through manifold 25 and nozzle 16. The varistor 21 is built up upon the rotating support 24 of the coating table assembly 23. The height and diameter of the varistor can accurately be gaged by the speed of rotation in the direction of the indicating arrow, the location of the nozzle relative to the rotating support and both the flow rate and concentration of the precursor powder. The coating table comprises the rotating support which is connected by gears or pullies to shaft 27 of motor 26 and is supported upon a base member 28. When ultrapure zinc oxide varistors are desired the precursor materials can be formed from ultrapure liquid compounds which react with the oxygen entraining gas to form the respective oxides insitue. The zinc oxide precursor would then be a zinc chloride solution and the bismuth precursor, for example, would comprise bismuth trichloride.

When forming ultrapure zinc oxide varistor material having exceptionally good electrical characteristics the plasma spray technique of FIG. 6 is preferred. When relatively inexpensive zinc oxide varistors or varistor devices are to be manufactured the flame spray technique of FIG. 1 is preferred since the flame process does not readily lead to ultrapure materials.

One of the advantages of the method of the instant invention is the ability to make non-linear resistors by calcining the chemical constituents consisting of zinc oxide and various additives without first having to sinter the constituents. This is a valuable feature since calcining can be achieved in air by heating at relatively low temperatures compared to the higher sintering temperatures. In some instances partial calcining can be achieved during the actual flame spray process.

The method of the instant invention also allows varistors to be manufactured having predetermined and carefully controlled resistance values. Zinc oxide materials having very high resistance for example can be combined with materials having low resistance values to provide any intermediate range of desired resistance to the varistor devices.

Although the methods of the invention are disclosed for manufacturing zinc oxide varistors for surge arrester applications this is by way of example only. The varistors manufactured by the methods of the invention find application wherever zinc oxide varistors may be employed.

I claim:

1. A method for manufacturing sinterless zinc oxide varistor devices comprising the steps of:
providing a mixture of zinc oxide powder and additive metal oxide powders;
subjecting the mixture to a high temperature flame for heating and fusing the oxides;
providing an oxygen containing gas stream for directing the oxide powders through the flame;
directing the fused oxides upon the surface of an electrically insulating aluminum oxide substrate to form the varistor material on the substrate; and
providing at least one metal electrode layer on the varistor material.

2. The method of claim 1 wherein the additive metal oxides include bismuth.

3. The method of claim 1 wherein the metal electrode comprises aluminum.

4. The method of claim 1 wherein the substrate comprises a tubular member.

5. The method of claim 1 including the step of removing a portion of the metal oxide coating to provide a trimmable non-linear resistor.

6. The method of claim 1 wherein the substrate comprises a planar surface and wherein the metal oxide layer has a region of reduced cross section for providing a fusible varistor.

7. A method for forming high purity sinterless varistor materials comprising the steps of:
providing zinc and bismuth chloride varistor precursor materials;
entraining the chlorides in an oxygen containing gas stream;
adding an inert gas to the oxygen containing gas stream;
directing the entrained chlorides through a plasma torch for heating the chlorides to form zinc and bismuth oxide powders and fusing the powders; and
directing the fused powders upon the surface of an electrically insulating aluminum oxide substrate to form a varistor body.

8. The method of claim 7 including the step of rotating the substrate in order to generate a cylinder of the varistor material.

9. A method of forming a sinterless zinc oxide varistor comprising the steps of:
providing a tubular insulating aluminum oxide substrate;
mixing a plurality of metal carbonates with zinc nitrates to form the varistor precursor mixture;
introducing an air stream to the precursor mixture to entrain the mixture and to form a continuous stream of airborn particles;
directing the entrained particles through a high temperature flame for fusing the particles upon the substrate;
applying a layer of aluminum at both ends of the substrate to provide a pair of electrodes; and
removing part of the oxide layer to form a thin spiral of oxide material around the substrate.

* * * * *